Nov. 2, 1948.     F. KRAKE     2,452,938
BOAT-CARRYING TRAILER
Filed Jan. 19, 1946     4 Sheets-Sheet 1
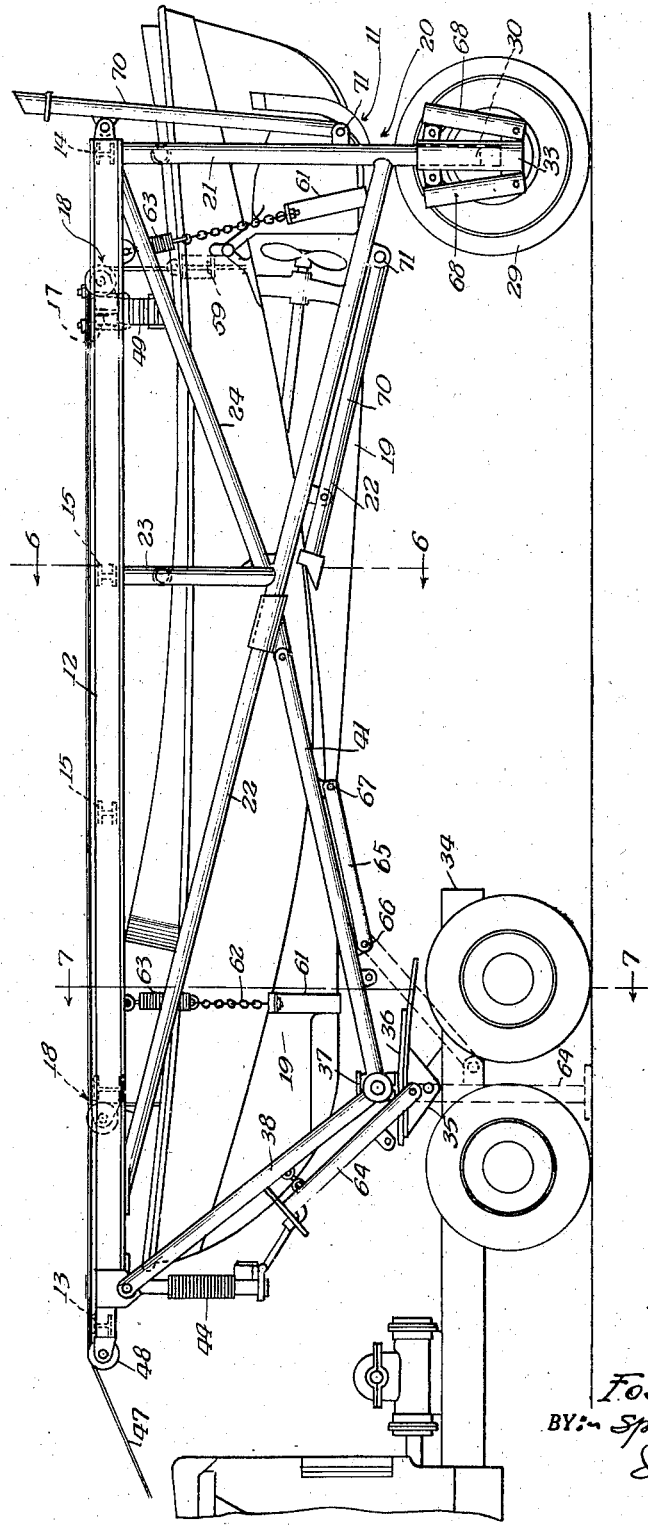
INVENTOR:
FOSTER KRAKE
BY: Spencer, Marzall,
Johnston & Cook
Attys.

Nov. 2, 1948.   F. KRAKE   2,452,938
BOAT-CARRYING TRAILER
Filed Jan. 19, 1946   4 Sheets-Sheet 2
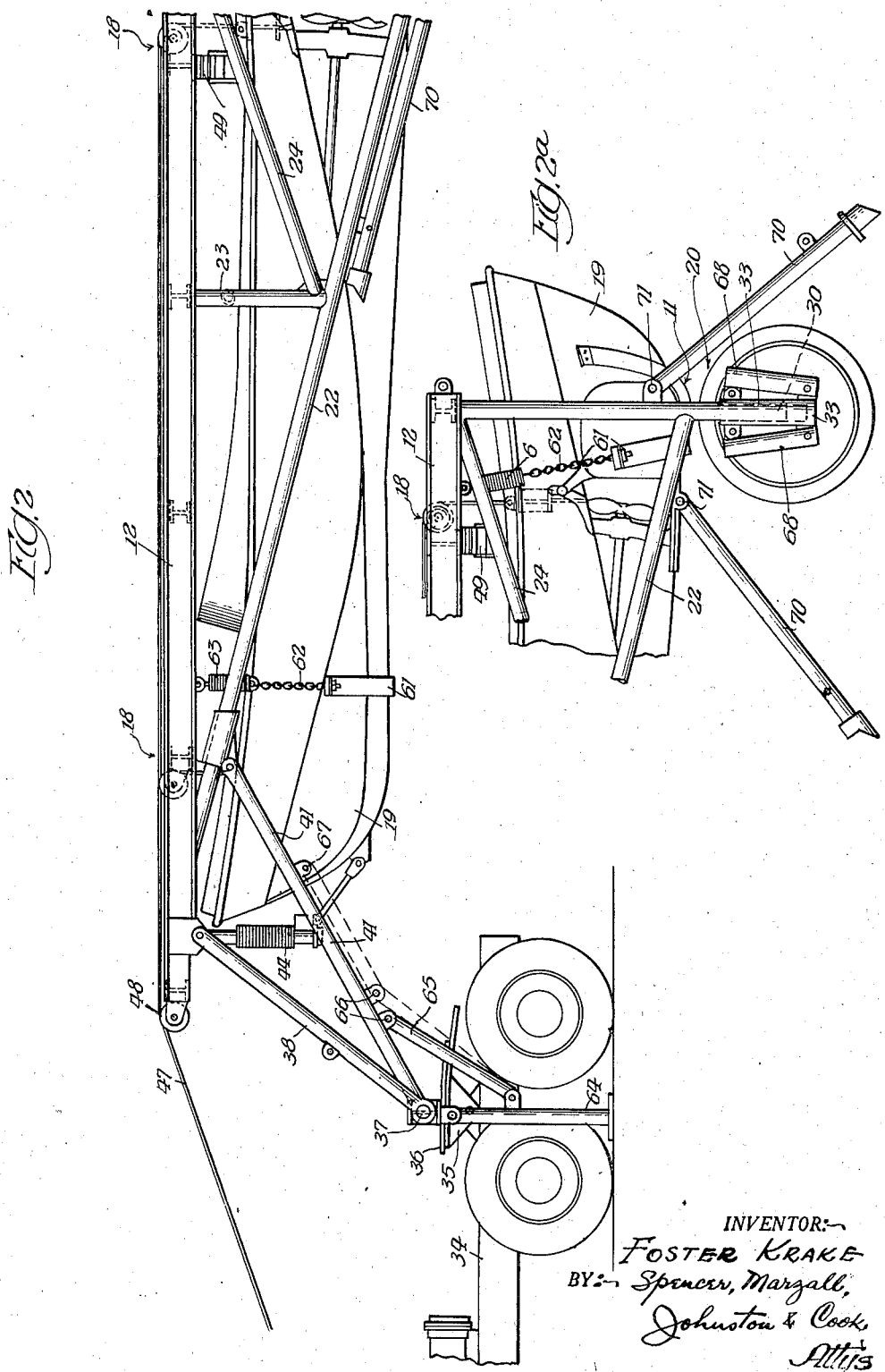

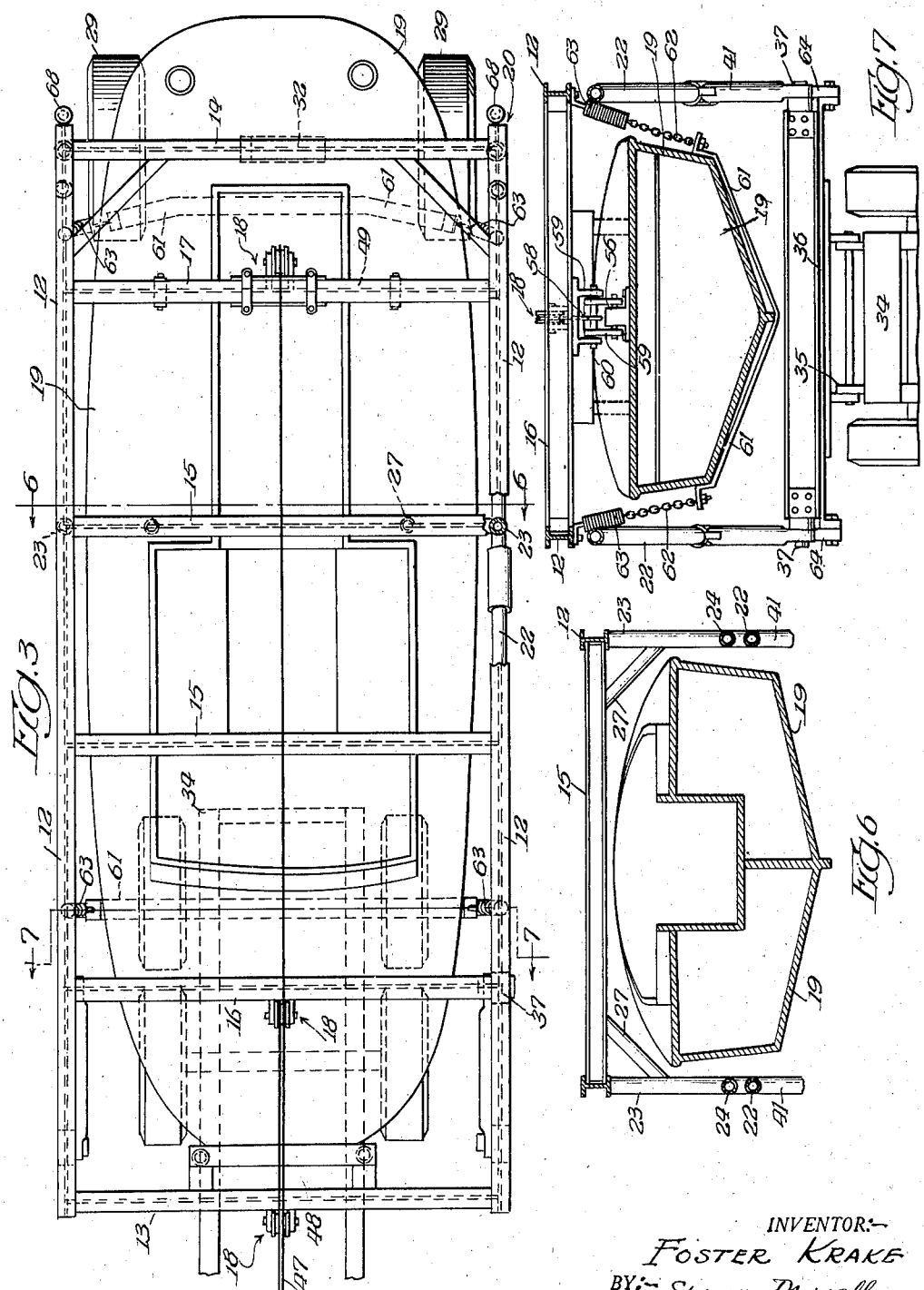

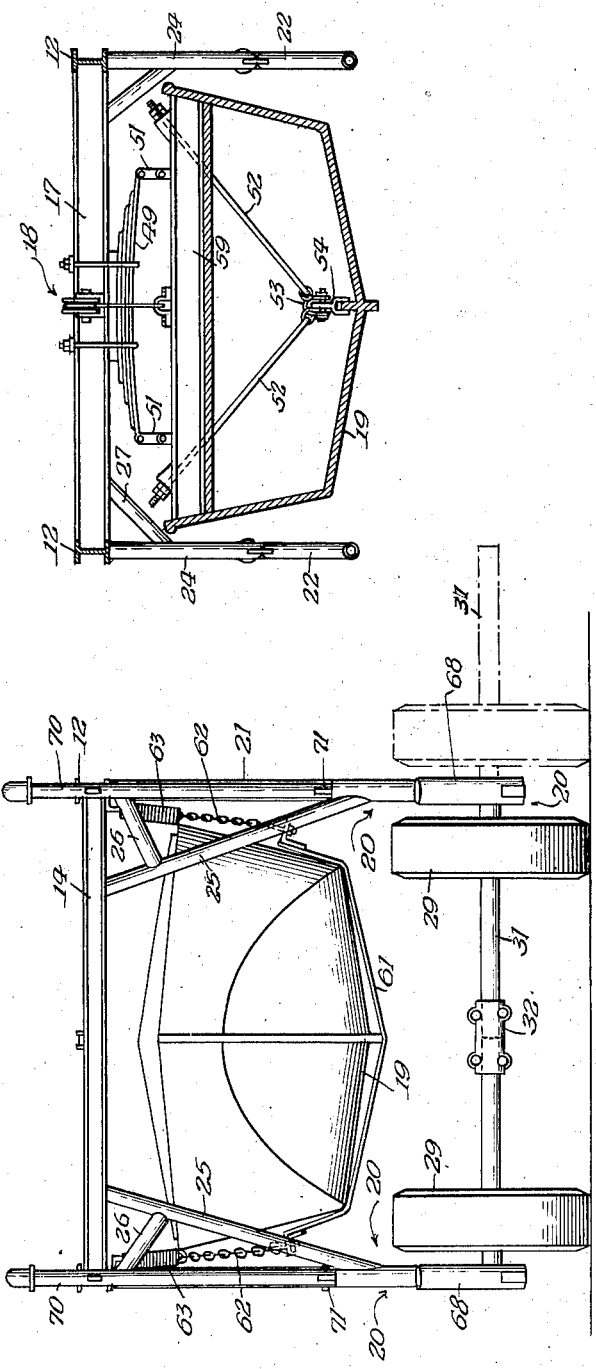

Patented Nov. 2, 1948

2,452,938

UNITED STATES PATENT OFFICE 2,452,938

BOAT-CARRYING TRAILER

Foster Krake, Coloma, Mich., assignor to Sporting Specialties Company, Coloma, Mich., a corporation of Michigan Application January 19, 1946, Serial No. 642,226

16 Claims. (Cl. 214—65)

The present invention relates in general to carriers, and has more particular reference to a trailer device for the transportation of boats and other objects, the invention having specific application to a carrier device adapted to be drawn overland by a suitable tractor, such as a truck having a fifth wheel.

An important object of the invention is to provide an inexpensive and relatively light weight, yet strong and rugged, trailer construction that can be manufactured at relatively low cost as by utilizing structural elements comprising connectible pipe stock; a further object being to provide a trailer that can be easily attached to and detached from a suitable tractor.

Another important object is to provide a trailer for an object, such as a boat, of appreciable size, wherein the object to be transported on the trailer may be quickly and easily mounted in and demounted from suspended position.

Another important object is to provide a trailer adapted for connection with a tractor and including means whereby the trailer may be projected outwardly of the tractor into extended position clear of the tractor while remaining attached thereto, such extended position allowing the transportable object to be elevated into and lowered from suspended carrying position in the trailer, the trailer being retractable, from such extended position, into traveling position in which at least the forward portions of the trailer and an object suspended thereon extend in overlapping relationship above at least the rearmost portions of the tractor, whereby a minimum over-all length of trailer and tractor is accomplished.

Another important object resides in providing a trailer having tractor-hitch means including rockable members whereby at least one end of the trailer may be supported on and attached to the tractor in outwardly projected loading and unloading position, and in retracted traveling position with respect to the tractor; a further object being to form such rockable means for easy operation to attain projected and retracted trailer positions with respect to the tractor.

Another important object is to provide novel means for anchoring the trailer against movement whereby to accomplish extension and retraction of the trailer by moving the tractor toward and away from the trailer.

Another important object is to provide a trailer having wheels at one end and tractor-hitching means at the other, including extensible leg means for supporting the tractor connectible end of the trailer, when disconnected from the tractor, in either extended or retracted position.

Another important object is to provide improved suspension means for supporting a boat or other transportable object on the trailer.

A further object is to provide a carrier or trailer comprising spaced supporting wheels whereby said carrier may straddle the object to be carried, the trailer being provided with power multiplying means for lifting or lowering the transportable object to or from suspended position in the frame; a further object being to provide for disposing the trailer wheels outwardly on the trailer frame to allow the transportable object to be lifted into and lowered from carrying position, and to return the wheels inwardly of said frame into traveling position beneath a transportable object suspended in traveling position on the frame.

The foregoing and numerous other important objects, advantages, and inherent functions of the invention will become apparent as the invention is more fully understood from the following description, which, taken in connection with the accompanying drawings, discloses a preferred embodiment of the invention.

Referring to the drawings:

Fig. 1 is a side elevation view of a trailer embodying the present invention shown in overland traveling position;

Fig. 2 is a side elevation of the forward portions, and Fig. 2a is a side elevation of the rearward portions of the trailer shown in extended loading and unloading position;

Fig. 3 is a top plan view of the trailer in extended position;

Fig. 4 is a right-hand end elevation of Fig. 1;

Fig. 5 is a vertical sectional view of Fig. 1, in advance of the rear end of the trailer and just behind the supporting springs; and Figs. 6 and 7 are sectional views, respectively, taken substantially along the lines 6—6 and 7—7 in Fig. 1.

As shown in the drawings, the trailer may embody a main frame 12—13 comprising a pair of spaced apart longitudinally extending frame members 12, which may conveniently comprise I beams, disposed on the opposite sides of the trailer frame. At the opposite ends of the frame, the members 12 are connected together and maintained in spaced relationship by front and rear transverse spacing and bracing beams 13 and 14, the intermediate portions of the frame being braced and spaced at one or more transverse beams 15. Additional transverse beams 16 and 17 may be provided in position spaced from the front and back spacing beams 13 and 14, said beams 16 and 17 providing mountings for hoisting apparatus 18 for raising and lowering an object, such as a boat 19, to and from supported position in the frame. The transverse bracing and spacing beams 13—17 may comprise suitable structural elements of any preferred form, including tubular members, although, as shown in the drawings, I beams may be utilized if desired. In either case, the transverse bracing and spacing beams may be welded or otherwise rigidly secured to the side beams 12 in order to form an integral trailer frame structure.

The frame is provided with dependent wheel carrying legs 20, on opposite sides of the frame, said legs each preferably comprising tubular members including a vertical dependent member 21, fastened to and extending downwardly from the rear end of a longitudinal frame member 12, and an inclined bracing member 22, fastened to and extending between the forward portions of the frame member 12 and the lower portions of the dependent leg member 21. Each leg structure in addition may include a bracing member 23, extending between and secured to the medial portions of the longitudinal frame member 12 and the inclined leg member 22, and an inclined bracing member 24, extending between and fastened to the rearward portions of the longitudinal member 12 and the medial portions of the inclined leg member 22, whereby a skeletal wheel carrying leg structure, adequately braced in a fore and aft direction, is provided.

The wheel carrying legs 20 are also preferably braced transversely, as shown more particularly in Fig. 4, as by inclined bracing members 25, fastened to and extending between the end portions of the transverse bracing beam 14 and the medial portions of the legs 20; the upper portions of the legs 20 and of the inclined bracing members 25 may also be interconnected by bracing members 26 extending therebetween and fastened thereto. The leg structures 20 may also be transversely braced, as by inclined bracing members 27 extending between the medial portions of the members 23 and adjacent end portions of a beam 15.

If desired, the frame structure may also be braced by diagonal members extending between the longitudinal members 12 and any or all of the transverse bracing beams 13—17.

The wheel carrying legs 20 may be provided each with a wheel 29, the wheels being mounted each on a dependent portion 30 of the leg construction. To this end, each wheel is preferably journaled for rotation on an axle member 31, which may extend toward, and in axial alignment with the corresponding axle member of the other wheel. The abutting ends of the axle members may be secured together, preferably in detachable fashion as by means of a suitable coupling 32. On the outwardly facing sides of the wheel 29, the axles 31 may be provided each with a journal member 33 for turnably receiving the corresponding wheel mounting portion 30. The wheels and their axles may thus be mounted for rotational movement about the substantially vertical axes of the mounting portions 30. By disconnecting the coupling 32, both wheels may be turned on their respective mountings 30 into position extending outwardly of the wheel carrying legs, as indicated in dotted lines in Fig. 4. When in such outwardly turned position, the space between the legs is entirely unobstructed, thereby allowing the loading and unloading of a boat or other object on the trailer within the space between said legs 20. After loading or unloading, the trailer may be conditioned for overland transit by returning the wheels to normal traveling position inwardly of the legs and by replacing the coupling 32 in order to hold the wheels in traveling alignment. Means, such as a pin, adapted for removable engagement in aligned openings in the leg portions 30 and the mounting journals 33, may be provided to hold the wheels in outwardly turned position to allow the trailer to be rolled into or from position straddling the transportable object after it has been lowered from, or before it has been hoisted into carrying position on the frame.

At its forward end the trailer frame is provided with means for attaching the same to a tractor 34. To this end, the tractor preferably is provided with fifth wheel mounting means 35 adapted to hitch with a cooperating fifth wheel 36, said fifth wheel comprising a member connected to the frame 12—13 at the forward end thereof. As shown, the member 36 is mounted substantially centrally of a transverse I beam 37 to the opposite ends of which are pivoted preferably tubular support members 38, the members 38 having ends pivoted, as at 39, to the I beam, and I beam remote ends pivoted, as at 40, in brackets secured on and to the longitudinal frame members 12 at or adjacent the forward ends thereof. Also pivotally connected on the I beam at 37 are support members 41, the beam remote ends of which are pivoted, as at 42, on sleeve journal members 43, which slidably embrace the forward portions of the inclined leg members 22.

By blocking the frame 12—13 against forward or rearward movement, the frame may be extended from the contracted traveling position, shown in Fig. 1, to the extended loading position, shown in Fig. 2, by moving the tractor 34 forwardly with respect to the frame of the carrier, the sleeves 43 sliding forwardly on the forward portions of the bracing members 22, and the support members 38 rocking forwardly on the pivots 40. After unblocking the frame against movement, the carrier, in extended position and with its wheels 29 rotated outwardly, as shown in dotted lines in Fig. 4, may be backed into position above and straddling the object to be loaded, which may then be elevated into suspended position in the frame 12—13 by the hoisting apparatus 18, which will be hereinafter more fully described.

By reblocking the loaded carrier against movement, the same may be returned to folded traveling position by backing the tractor under the forward end of the carrier, thereby forcing the sleeves 43 rearwardly on the frame member 22 and causing rearward rotation of the members 38 on the pivots 40. The frame may be locked in either folded or extended position, as by means of pins fitting into openings formed in the sleeves 43 and in the members 22. After being locked in the folded or traveling position, the carrier will be ready for overland transportation by the tractor after the frame has been unblocked and the wheels 29 have been returned from outwardly rotated position to the traveling position shown in solid lines in Fig. 4. The suspended device 19 may be unloaded by reversing the foregoing procedure.

In order to provide for blocking the carrier against forward or rearward movement while the members 38 and 41 are being drawn to extended position or forced rearwardly to folded position, the frame may be provided with blocking bars having ends pivoted on the carriage and ground-engaging ends for digging into the ground on the opposite sides of the wheels 29 to thus block the carriage against movement. To this end, the carriage may be provided with blocking members 68 pivotally mounted, as at 69, on the wheel carrying members 33, the members 68 being normally latched in raised inoperative position on the member 33. The members 68 are adapted, when unlatched, to rotate on their pivots 69 to allow the free ends thereof to engage and grip the ground on opposite sides of the wheel, to thus anchor the frame and block movement thereof in either direction.

If desired, blocking members 70, of substantially greater length than the members 68, may be pivotally mounted, as at 71, on the members 21 and 22 adjacent the lower ends thereof. The members 70 may normally be suspended in raised, inactive position parallel with and latched to the members 21 and 22. The members 70, however, may be unlatched and their free ends swung into position to engage the ground on opposite sides of the wheels 29 in order to block the carriage against movement.

In connection with loading and unloading operations, it should be noted that a boat usually will be loaded in the trailer with its bow toward the front end of the trailer, although a boat could be carried in the trailer stern foremost, if desired. It is ordinarily desirable to provide a suitable guard 44 at the forward end of the boat, the same comprising a framework that may be temporarily mounted at the forward end of the object being carried, as by attaching the same on suitable brackets mounted on the boat.

In order to provide for the raising and lowering of the object to be carried to and from carrying position in the frame 12—13, the frame bracing members 16 and 17 may be provided with brackets 45 carrying pulley wheels 46. The pulley wheels 46 are adapted to support flexible hoisting elements, such as ropes 47, means being provided to attach the ends of the ropes 47 to the object 19. The ropes 47 may extend from the pulleys to suitable winding mechanism, which may be mounted on the frame 12—13, as on the forward bracing member 13 of the frame; or the winding mechanism may be mounted on the tractor 34. In such case, the forward frame member 13 may be provided with suitable bracket means carrying guide pulleys 48 for guiding the hoisting ropes 47 to the winding mechanism on the tractor.

Suspension means, preferably in the form of leaf springs 49, may be mounted on the frame, as at the transverse bracing member 17, in order to resiliently support the object 19 thereon. To this end, the spring means 49 may be provided with ends formed for shackled connection with suitable bracket means 50 connected to the carried object 19.

The bracket means 50 may comprise a yoke in the form of a transverse beam adapted to overlie the boat, near an end thereof, and formed with lugs 51 for attachment to the spring. The yoke forming beam 50 may be anchored on the boat by means of inclined tension rods 52 detachably secured to the boat, as by means of a U-bolt 53 secured to a perforated lug 54 mounted on the keel of the boat. The beam 50 may be formed with an eye 55 for detachably receiving a hoisting hook on one of the ropes 47.

The boat, near its other end, may be provided with a lug 56 adapted to be detachably pinned to a bracket 57 having an eye portion 58 for detachably receiving a hoisting hook on one of the ropes 47. The cross-member 17, at the hoisting pulley thereon, may be formed with dependent lugs 59 adapted to receive the bracket 57 therebetween, said lugs and bracket being formed with openings for the removable reception of a mounting pin 60 whereby to support the forward portions of the boat on the frame, the rearward portions being carried on the spring means 49.

In addition to the supporting means described in the immediately preceding paragraphs, auxiliary suspension means may be provided at the opposite ends of the frame 12—13, the same comprising preferably flexible fabric bands 61 adapted to underlie the object 19 and to be connected, at the opposite ends of the bands 61, to flexible chains 62, which may be connected on suitable bracket means on the frame members 12, on opposite sides of the carrier, spring means 63 being connected in the members 62, if desired.

The coupling device 36, at the forward end of the frame, may be of any suitable or preferred form to enable the trailer to be secured on the tractor. It may, and preferably does incorporate leg means for supporting the forward end of the trailer when the same is disconnected from the tractor. Such support means may comprise a folding leg, or legs 64 pivotally connected, as on the I beam 37, and normally supported in raised position detachably linked to the frame member 38. The leg may be released from the member 38 and swung to the operative ground engaging position, shown in Fig. 2, and held in braced position by means of a bracing bar 65 detachably connected to and extending between the leg and the movable frame member 41. In order that the leg may thus be braced in frame-supporting position when the parts 38 and 41 are in either extended or folding position, the member 41 may be provided with two spaced lugs 66 for the attachment of the bracing bar 65, one lug being used when the frame is to be supported in extended position, and the other being used when the frame is supported in retracted position. When the leg 64 is not in use, the bracing bar 65 may be mounted on the frame member 41, as by securing it to one of the lugs 66, and a spaced mounting lug 67 on the member 41.

If desired, the legs 64 may be made adjustable as to length in order to support the coupling device 36 at a desired elevation. To this end, each leg 64 may comprise telescoping screw-threaded members.

It will be seen from the foregoing that the invention provides a strong and rigid carrier particularly for boats and other elongated objects of substantial size, the carrier being adapted for overland transportation by suitable tractor means. The carriage, also, is provided with means for facilitating the mounting of the object to be carried thereon. The carrier, furthermore, is provided with readily operable power multiplying hoisting means, which may be either manual or power-operated winding mechanism, for lifting the object into carrying position in the frame. The novel arrangement whereby the wheels are mounted on the carrier in fashion allowing the same to be opened outwardly to enable the carried object to be loaded, allows the carrier to have minimum over-all carrying width compatible with the maximum width of the carried object. The novel arrangement which allows the forward end of the carrier to be supported in position overlying the rearward end of the tractor provides for a minimum over-all length of carrier and tractor during overland transportation.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A carrier embodying a main non-collapsible frame, towing means at an end of said frame for detachable connection with a tractor, including rockable support means and bracing means, both pivoted on the frame and also on the towing means, for supporting the frame, selectively, in carrying position with the end thereof overlying said towing means, and in extended position offset with respect to said towing means, whereby to allow a transportable object to be loaded and unloaded from said frame when in extended position, said supporting means and said bracing means being foldable towards and away from each other.

2. A carrier embodying a main non-collapsible frame, towing means at an end of said frame for detachable connection with a tractor, including a support means pivotally connecting one end of the support to the frame and the other end to the tractor, for supporting the frame, selectively, in carrying position with the end thereof overlying said towing means, and in extended position offset with respect to said towing means, whereby to allow a transportable object to be loaded and unloaded from said frame when in extended position, and means pivotally connected to the towing means and slidably and pivotally connected to said frame, to secure the said support means in either of said positions.

3. A carrier embodying a main frame, towing means at an end of said frame for detachable connection with a tractor, including rockable support means on the frame for supporting the same, selectively, in carrying position witth the end thereof overlying said towing means and in extended position offset with respect to said towing means, whereby to allow a transportable object to be loaded and unloaded from said frame when in extended position, said frame having inclined lateral frame members on opposite sides thereof extending downwardly from said end of the frame toward its opposite end, and said rockable support means embodying a support member pivotally connected at its opposite ends, respectively, with said towing means and said frame, and a bracing member having an end pivotally connected with said towing means, and a remote end slidingly mounted on said inclined frame member.

4. A carrier comprising a main frame, towing means at an end of said frame for detachable connection with a tractor, including rockable support means on the frame for supporting the same, selectively, in carrying position with the end thereof overlying said towing means, and in extended position offset with respect to said towing means, whereby to allow a transportable object to be loaded and unloaded from said frame when in extended position, said frame having inclined lateral frame members on opposite sides thereof extending downwardly from said end of the frame toward its opposite end, and said rockable support means comprising a support member pivotally connected at its opposite ends, respectively, with said towing means and said frame, and a bracing member having an end pivotally connected with said towing means, a remote end slidingly mounted on said inclined frame member, and means to secure said rockable support means on the frame in either of said positions, comprising means for latching the slidably mounted end of said bracing member on said inclined member.

5. A carrier comprising a main frame, dependent frame supporting legs on the opposite side of said frame and carrying wheel mountings, towing means at an end of said frame, remote from said wheel mountings, for detachable connection with a tractor, including rockable support means on the frame for supporting the same, selectively in carrying position with the end thereof overlying said towing means, and in extended position offset with respect to said towing means, whereby to allow a transportable object to be loaded and unloaded from said frame when in extended position, said wheel mountings each carrying an axle, a wheel on each axle, said mountings being turnable on said legs to dispose said wheels selectively in normal position inwardly of said legs and in extended position outwardly of said legs to facilitate the loading and unloading of a transportable object on the frame in the space between said legs.

6. A carrier comprising a main frame, dependent frame supporting legs on the opposite side of said frame and carrying wheel mountings, towing means at an end of said frame, remote from said wheel mountings, for detachable connection with a tractor, including rockable support means on the frame for supporting the same, selectively in carrying position with the end thereof overlying said towing means, and in extended position offset with respect to said towing means, whereby to allow a transportable object to be loaded and unloaded from said frame when in extended position, said wheel mountings each carrying an axle, a wheel on each axle, said mountings being turnable on said legs to dispose said wheels selectively in normal position inwardly of said legs and in extended position outwardly of said legs to facilitate the loading and unloading of a transportable object on the frame in the space between said legs, and means to latch said wheel mountings in either of said rotated positions.

7. A carrier comprising a main frame, dependent frame supporting legs on the opposite side of said frame and carrying wheel mountings, towing means at an end of said frame, remote from said wheel mountings, for detachable connection with a tractor, including rockable support means on the frame for supporting the same, selectively in carrying position with the end thereof overlying said towing means, and in extended position offset with respect to said towing means, whereby to allow a transportable object to be loaded and unloaded from said frame when in extended position, said wheel mountings each carrying an axle, a wheel on each axle, said mountings being turnable on said legs to dispose said wheels selectively in normal position inwardly of said legs and in extended position outwardly of said legs to facilitate the loading and unloading of a transportable object on the frame in the space between said legs, said axles being adapted for aligned abutting end-to-end relationship when said mountings are in normal position, and demountable clamp means for securing the abutting ends of said axles together.

8. A carrier embodying a main frame, towing means at an end of said frame for detachable connection with a tractor, including rockable support means on the frame for supporting the same, selectively, in carrying position with the end thereof overlying said towing means, and in extended position offset with respect to said towing means, whereby said supporting means embodying two members pivotally connected by adjacent ends to the towing means, and pivotally connected at their opposite ends to the said frame at points remote from each other, said members being foldable towards and away from each other, to allow a transportable object to be loaded and unloaded from said frame when in extended position, supporting wheels on said frame remote from said towing means, and normally inoperative ground-engaging means on said frame and movable thereon to ground-engaging position to block movement of said frame with respect to ground in at least one direction to allow said rockable support means to be moved from one of said positions to the other by moving the tractor-connecting towing means with respect to the blocked frame.

9. A carrier embodying a main frame, towing means at an end of said frame for detachable connection with a tractor, including rockable support means on the frame for supporting the same, selectively, in carrying position with the end thereof overlying said towing means, and in extended position offset with respect to said towing means, said supporting means embodying two members pivotally connected by adjacent ends to the towing means, and pivotally connected at their opposite ends to the said frame at points remote from each other, said members being foldable towards and away from each other, whereby to allow a transportable object to be loaded and unloaded from said frame when in extended position, supporting wheels on said frame remote from said towing means, and normally inoperative ground-engaging means on said frame and movable thereon to ground-engaging position to block movement of said frame with respect to ground in at least one direction, to allow said rockable support means to be moved from one of said positions to the other by moving the tractor-connecting towing means with respect to the blocked frame, said ground-engaging means comprising bars having portions pivotally connected on said frame, remote portions formed for ground-engagement, and means to normally suspend said remote portions in inoperative position on said frame.

10. A carrier comprising a main frame, dependent frame supporting legs on the opposite side of said frame and carrying wheel mountings, towing means at an end of said frame, remote from said wheel mountings, for detachable connection with a tractor, including rockable support means on the frame for supporting the same, selectively in carrying position with the end thereof overlying said towing means, and in extended position offset with respect to said towing means, whereby to allow a transportable object to be loaded and unloaded from said frame when in extended position, supporting wheels on said mountings, and normally inoperative ground-engaging means on said wheel mountings and comprising bars having portions pivotally connected on said wheel mountings, remote ground-engaging portions adapted to engage the ground to block movement of said frame with respect to ground in at least one direction, to allow said rockable support means to be moved from one of said positions to the other by moving the tractor-connecting towing means with respect to the blocked frame, and means normally suspending the ground-engaging portions of said bars in inoperative position on said wheel mountings.

11. A carrier embodying a main frame, towing means at an end of said frame for detachable connection with a tractor, including rockable support means on the frame for supporting the same, selectively, in carrying position with the end thereof overlying said towing means, and in extended position offset with respect to said towing means, said supporting means embodying two members pivotally connected by adjacent ends to the towing means, and pivotally connected at their opposite ends to the said frame at points remote from each other, said members being foldable towards and away from each other, whereby to allow a transportable object to be loaded and unloaded from said frame when in extended position, ground-engaging leg means on said towing means to support the same at a predetermined elevation with respect to ground when disconnected from said tractor, and means for supporting said ground-engaging leg means in inoperative position upon said rockable support means.

12. A carrier embodying a main frame, towing means at an end of said frame for detachable connection with a tractor, including rockable support means on the frame for supporting the same, selectively, in carrying position with the end thereof overlying said towing means, and in extended position offset with respect to said towing means, said supporting means embodying two members pivotally connected by adjacent ends to the towing means, and pivotally connected at their opposite ends to the said frame at points remote from each other, said members being foldable towards and away from each other, whereby to allow a transportable object to be loaded and unloaded from said frame when in extended position, and hoisting means on said frame and operable to raise or lower a transportable object to or from carrying position on the frame.

13. A carrier embodying a main frame, towing means at an end of said frame for detachable connection with a tractor, including rockable support means on the frame for supporting the same, selectively, in carrying position with the end thereof overlying said towing means, and in extended position offset with respect to said towing means, said supporting means embodying two members pivotally connected by adjacent ends to the towing means, and pivotally connected at their opposite ends to the said frame at points remote from each other, said members being foldable towards and away from each other, whereby to allow a transportable object to be loaded and unloaded from said frame when in extended position, hoisting means on said frame and operable to raise or lower a transportable object to or from carrying position on the frame, and means for suspending said object in carrying position.

14. A carrier embodying a main frame, towing means at an end of said frame for detachable connection with a tractor, including rockable support means on the frame for supporting the same, selectively, in carrying position with the end thereof overlying said towing means, and in extended position offset with respect to said towing means, said supporting means embodying two members pivotally connected by adjacent ends to the towing means, and pivotally connected at their opposite ends to the said frame at points remote from each other, said members being foldable towards and away from each other, whereby to allow a transportable object to be loaded and unloaded from said frame when in extended position, hoisting means on said frame and operable to raise or lower a transportable object to or from carrying position on the frame, comprising guide supporting hoisting ropes toward the opposite ends of said frame in position for connection with spaced portions of the transportable object, and winding mechanism for said ropes.

15. A carrier embodying a main frame, towing means at an end of said frame for detachable connection with a tractor, including rockable support means on the frame for supporting the same, selectively, in carrying position with the end thereof overlying said towing means, and in extended position offset with respect to said towing means, said supporting means embodying two members pivotally connected by adjacent ends to the towing means, and pivotally connected at their opposite ends to the said frame at points remote from each other, said members being foldable towards and away from each other, whereby to allow a transportable object to be loaded and unloaded from said frame when in extended position, hoisting means on said frame and operable to raise or lower a transportable object to or from carrying position on the frame, and means for suspending said object in carrying position, including spring suspension means for connecting the transportable object on said frame toward at least one end thereof.

16. A carrier embodying a main frame, towing means at an end of said frame for detachable connection with a tractor, including rockable support means on the frame for supporting the same, selectively, in carrying position with the end thereof overlying said towing means, and in extended position offset with respect to said towing means, said supporting means embodying two members pivotally connected by adjacent ends to the towing means, and pivotally connected at their opposite ends to the said frame at points remote from each other, said members being foldable towards and away from each other, whereby to allow a transportable object to be loaded and unloaded from said frame when in extended position, hoisting means on said frame and operable to raise or lower a transportable object to or from carrying position on the frame, means for suspending said object in carrying position, including spring suspension means for connecting the transportable object on said frame toward at least one end thereof, and means for suspending a remote portion of the transportable object on the frame toward its other end.

FOSTER KRAKE.

REFERENCES CITED

The following references are of record in the file of this patent:

UNITED STATES PATENTS

| Number | Name | Date |
|---|---|---|
| 1,531,180 | Erickson | Mar. 24, 1925 |
| 1,554,131 | Scharf | Sept. 15, 1925 |
| 1,861,556 | Smith et al. | June 7, 1932 |
| 2,112,201 | Larison | Mar. 22, 1938 |
| 2,218,510 | Albertson et al | Oct. 22, 1940 |
| 2,370,661 | Hayes | Mar. 6, 1945 |
| 2,375,754 | Ballinger | May 15, 1945 |
| 2,376,296 | Walter | May 15, 1945 |